US009083635B1

(12) United States Patent
Kelly et al.

(10) Patent No.: US 9,083,635 B1
(45) Date of Patent: Jul. 14, 2015

(54) ENQUEUE POLICING SYSTEMS AND METHODS

(75) Inventors: Jamie S. Kelly, Madison, AL (US); Andrew T. Ruble, Elkmont, AL (US); Troy Wayne White, Toney, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 12/897,452

(22) Filed: Oct. 4, 2010

(51) Int. Cl.
  *H04L 12/28* (2006.01)
  *H04L 12/819* (2013.01)
  *H04L 12/24* (2006.01)

(52) U.S. Cl.
  CPC ............ *H04L 47/21* (2013.01); *H04L 41/5045* (2013.01)

(58) Field of Classification Search
  USPC ......... 370/231, 252, 253, 352, 380, 398, 401, 370/412, 413, 468
  See application file for complete search history.

(56) References Cited

U.S. PATENT DOCUMENTS

| | | | |
|---|---|---|---|
| 6,377,554 B1 * | 4/2002 | Farnsworth et al. | 370/252 |
| 6,674,718 B1 * | 1/2004 | Heddes et al. | 370/230 |
| 6,765,873 B1 * | 7/2004 | Fichou et al. | 370/235 |
| 6,826,150 B1 | 11/2004 | Bhattacharya et al. | |
| 6,901,052 B2 * | 5/2005 | Buskirk et al. | 370/235 |
| 6,954,431 B2 * | 10/2005 | Roberts | 370/235 |
| 6,958,998 B2 * | 10/2005 | Shorey | 370/395.42 |
| 7,013,342 B2 * | 3/2006 | Riddle | 709/230 |
| 7,058,070 B2 * | 6/2006 | Tran et al. | 370/412 |
| 7,099,944 B1 * | 8/2006 | Anschutz et al. | 709/227 |
| 7,145,904 B2 * | 12/2006 | Zhao et al. | 370/371 |
| 7,203,193 B2 * | 4/2007 | Hoof | 370/389 |
| 7,212,534 B2 * | 5/2007 | Kadambi et al. | 370/395.2 |
| 7,342,929 B2 * | 3/2008 | Bremler-Barr et al. | 370/395.4 |
| 7,362,704 B2 * | 4/2008 | Sisto et al. | 370/230 |
| 7,496,661 B1 * | 2/2009 | Morford et al. | 709/224 |
| 7,580,352 B2 | 8/2009 | Iwata et al. | |
| 7,590,149 B1 * | 9/2009 | Bharali et al. | 370/468 |
| 7,639,694 B2 * | 12/2009 | DeCarolis et al. | 370/395.4 |
| 7,680,049 B2 * | 3/2010 | Olsen et al. | 370/235.1 |
| 7,688,853 B2 * | 3/2010 | Santiago et al. | 370/468 |
| 7,724,754 B2 * | 5/2010 | Kapoor et al. | 370/412 |
| 7,760,636 B1 * | 7/2010 | Cheriton | 370/235 |
| 7,804,777 B2 * | 9/2010 | Krueger | 370/232 |
| 7,957,319 B2 * | 6/2011 | Deshpande et al. | 370/253 |
| 8,139,485 B2 * | 3/2012 | Arseneault et al. | 370/230.1 |
| 8,208,395 B2 * | 6/2012 | Kotrla et al. | 370/252 |
| 8,774,003 B1 * | 7/2014 | Ruble et al. | 370/236 |
| 2003/0081546 A1 | 5/2003 | Agrawal et al. | |
| 2004/0081184 A1 * | 4/2004 | Magill et al. | 370/413 |
| 2008/0025214 A1 | 1/2008 | Bettink et al. | |
| 2008/0291882 A1 | 11/2008 | Martinotti et al. | |
| 2009/0193144 A1 | 7/2009 | Zeitak | |

* cited by examiner

*Primary Examiner* — Brian O'Connor
(74) *Attorney, Agent, or Firm* — Maynard Cooper & Gale, P.C.; Jon E. Holland

(57) ABSTRACT

Embodiments of the present disclosure generally pertain to systems and methods for policing packet networks. A system in accordance with an exemplary embodiment of the present disclosure includes an enqueue policer positioned within an intermediate node of a packet network prior to at least one egress queue. The enqueue policer utilizes information related to destination end-point capacity limits for a given customer in order to police packets based on such information at a relatively early point in the packet network. Thus, a packet that would have been dropped by an egress node due to capacity limits is dropped by the intermediate node thereby preventing the packet from needlessly consuming bandwidth of the network beyond the intermediate node.

25 Claims, 4 Drawing Sheets

ENQUEUE POLICING SYSTEMS AND METHODS

RELATED ART

Current packet networks, such as, for example, Ethernet local area networks ("E-LANs"), typically have a large number of nodes that route packets through the network. An ingress node generally refers to a node at the edge of the network that receives a packet flow for transmission through the network. An egress node generally refers to a node at the edge of the network through which a packet flow passes out of the network. An intermediate node refers to a node between a flow's ingress and egress nodes.

Each node of the network typically has ingress queues and egress queues for buffering packets within the node. Logic within each node typically pulls packets from ingress queues and forwards the packets to egress queues as appropriate based on a forwarding table such that each packet egresses the node from the appropriate port. During periods of congestion, it is possible for queues to overflow resulting in data loss.

A policer is typically used before an ingress queue in an ingress node in order to limit the amount of data entering the queue so that a particular data flow does not unfairly usurp an inappropriate amount of network resources. A policer typically uses a "leaky bucket" type algorithm as detailed in standards such as MEF 10. In this regard, a typical service level contract between a service provider and a customer sets limits on the average data rate ("R") in bits per second and maximum burst size ("B") in bytes allowed for the customer's E-LAN flow. Further, a policer is provisioned by the service provider so as to prevent R and B for the customer's E-LAN flow from exceeding the limits for R and B specified by the contract. Also, a shaper is typically used to uniformly rate limit a node's egress port.

Despite the use of policers and shapers, congestion nevertheless still frequently occurs in networks sometimes resulting in queue overflows and uncontrolled loss of data, particularly as service providers push networks to their performance limits in an effort to accommodate growing demands for network services. Techniques for more efficiently managing network services to limit and mitigate the effects of congestion are generally desired.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for policing packet networks. A system in accordance with an exemplary embodiment of the present disclosure comprises an enqueue policer positioned within an intermediate node of a packet network prior to at least one egress queue. The enqueue policer utilizes information related to destination end-point capacity limits for a given customer in order to police packets based on such information at a relatively early point in the packet network. Thus, a packet that would have been dropped by an egress node due to capacity limits is dropped by the intermediate node thereby preventing the packet from needlessly consuming bandwidth of the network beyond the intermediate node. A method in accordance with an exemplary embodiment of the present disclosure comprises determining a data rate threshold, determining a burst size threshold, receiving data packets, and dropping the data packets when the data rate threshold or the burst size threshold is exceeded.

Figure 1:
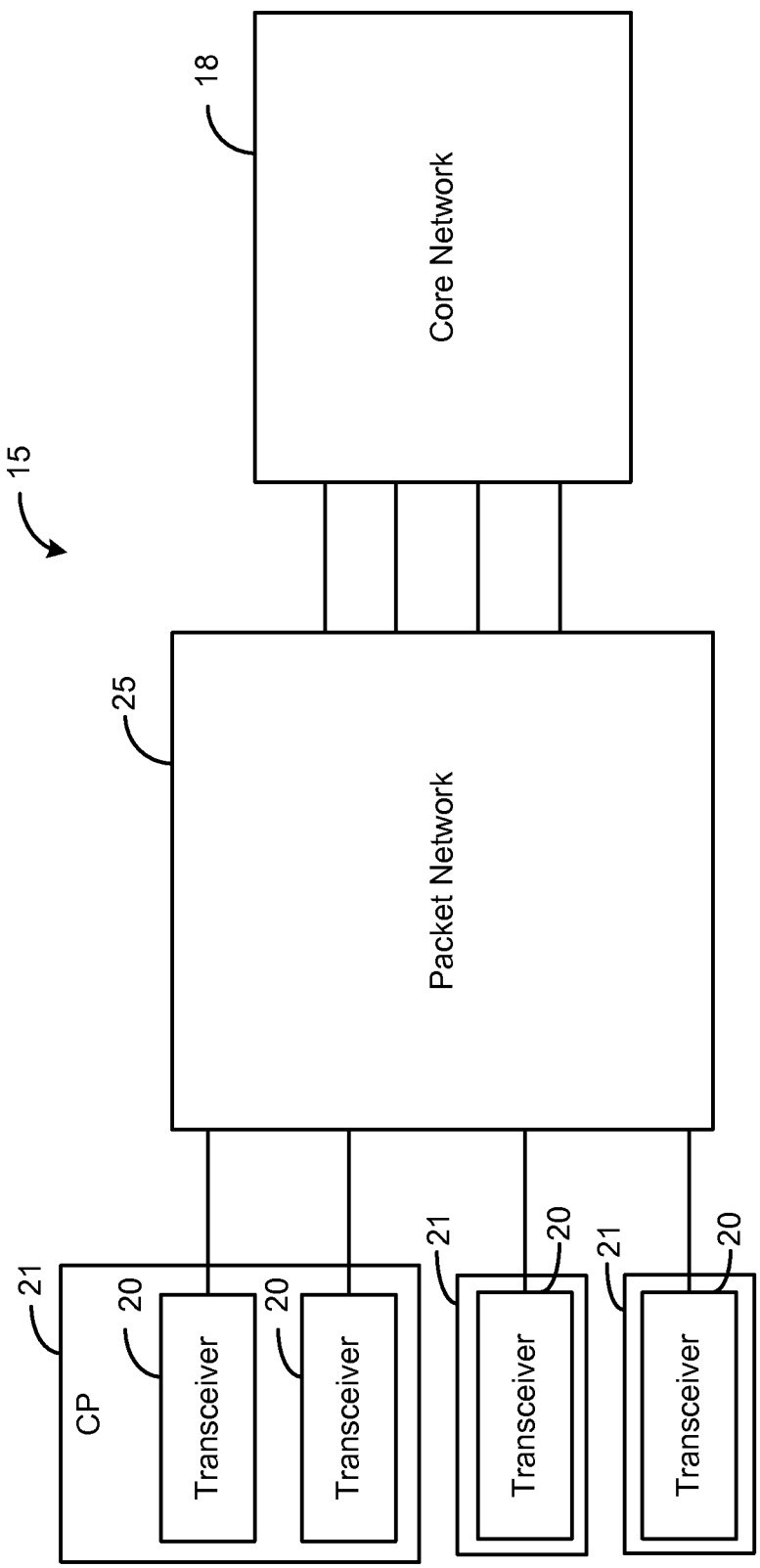
FIG. 1 is a block diagram illustrating an exemplary embodiment of a communication system that employs a packet network for communication between a core network and a plurality of customer premises transceivers.

FIG. 1 depicts an exemplary embodiment of a communication system 15 having a packet network 25 for transmitting data between a core network 18 and a plurality of transceivers 20 residing at a plurality of customer premises 21. Each of the transceivers 20 is coupled to the packet network 25 and used by a specific customer. While FIG. 1 shows four transceivers 20 coupled to the packet network 25, other numbers of transceivers 20 may be coupled to the packet network 25, and any number of transceivers 20 may reside at the same customer premises 21. The packet network 25 is configured to transmit data packets between the core network 18 and the transceivers 20 depending on the packet information and information provisioned in nodes of the network 25, discussed in more detail hereafter. In one embodiment, the packet network 25 is implemented as an Ethernet local area network ("E-LAN") such that Ethernet protocols are used to transmit the data packets through the network 25. In other embodiments, other types of protocols may be used.

Figure 2:
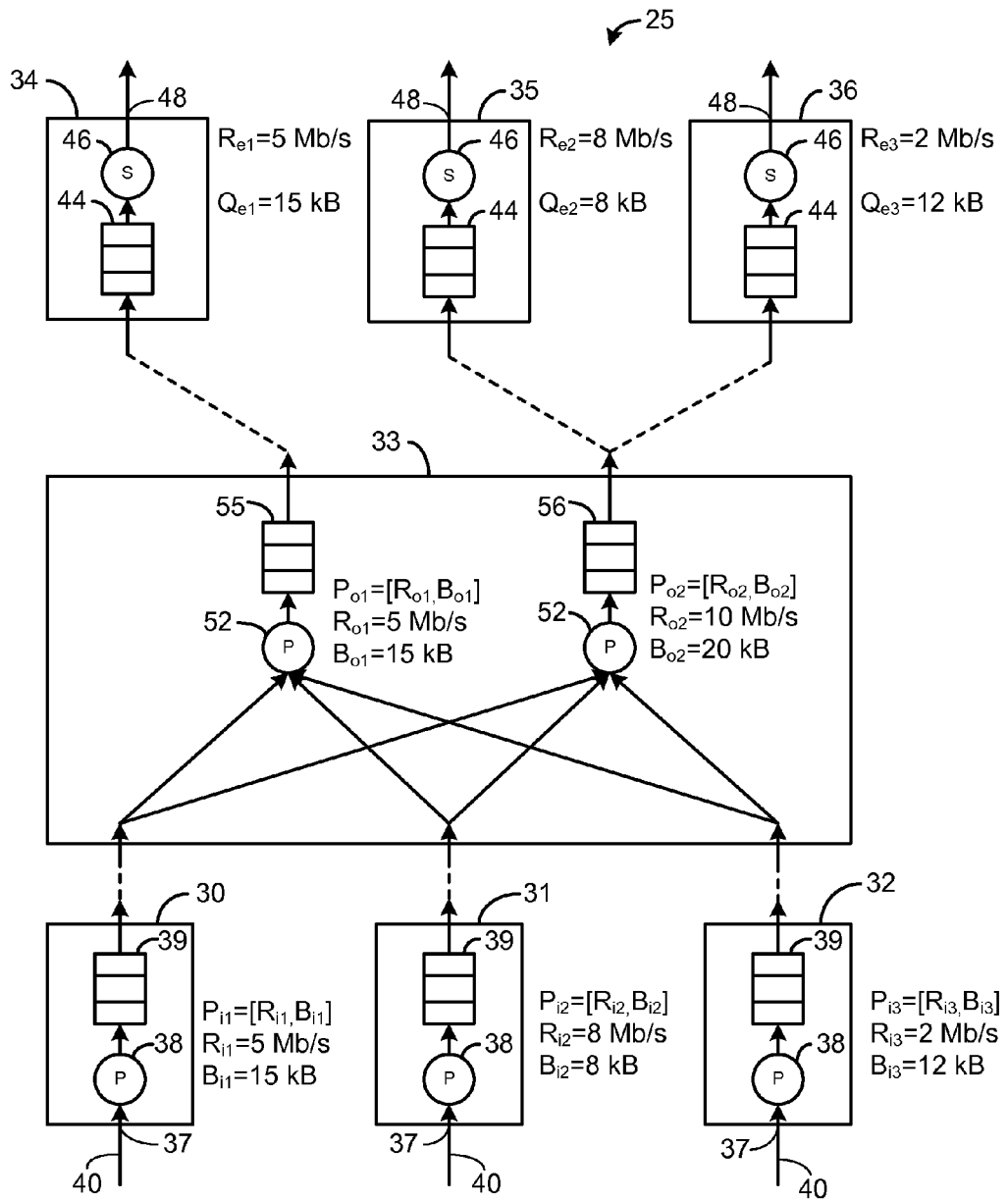
FIG. 2 is a block diagram illustrating an exemplary embodiment of a packet network, such as is depicted by FIG. 1.

FIG. 2 depicts an exemplary embodiment of the packet network 25 utilizing enqueue policers 52 in an intermediate node 33 of the network 25. As shown by FIG. 2, the packet network 25 comprises a plurality of ingress nodes 30-32, at least one intermediate node 33, described in more detail hereafter, and a plurality of egress nodes 34-36. In the network 25 shown in FIG. 2, each of the ingress nodes 30-32 comprises one or more ingress ports 37, a policer 38, and a queue 39. For illustrative purposes, only one ingress port 37, one policer 38, and one queue 39 are shown for each ingress node 30-32, but any number of ingress ports 37, policers 38, and queues 39 may be used in other embodiments. Also, the policers 38 may not be present in other embodiments of the packet network 25. Each ingress node 30-32 is associated with at least one E-LAN flow 40 comprising individual data packets (not specifically shown).

A data packet enters the packet network 25 through the ingress port 37 of an ingress node 30-32. A policer 38 is coupled to the ingress port 37 and is configured to limit the amount of data entering the queue 39 in an effort to prevent data overflow and ensure that specified performance limits for the received data flow 40 are not exceeded. For example, the policing parameters of the policer 38 are provisioned by a service provider such that the policer 38 only allows packets to enter the queue 39 which do not exceed R and B as defined in the service level contract between the service provider and the customer, while non-conforming packets are dropped. The queue 39 buffers each received packet, which is eventually transmitted downstream through the network 25 to the intermediate node 33. Notably FIG. 1 shows a single intermediate node 33 for simplicity. However, the network 25 may have any number of intermediate nodes, and a given packet may pass through any number of intermediate nodes before arriving at an egress node 34-36.

Each of the egress nodes 34-36 comprises a queue 44, a shaper 46, and an egress port 48. For illustrative purposes, only one queue 44, one shaper 46, and one egress port 48 are shown for each egress node 34-36, but any number of queues 44, shapers 46, and egress ports 48 may be used in other embodiments. The queue 44 stores packets as they arrive from the intermediate node 33. As known in the art, the shaper 46 uniformly limits the rate of the egress port 48 such that destination end-point capacity limits for rate and queue size are not exceeded. Packets travel through the shaper 46 and out of the egress port 48 to a destination end-point.

In the exemplary embodiment shown in FIG. 2, the intermediate node 33 comprises an enqueue policer 52 positioned before each egress queue 55-56. Each enqueue policer 52 is coupled to each of the ingress nodes 30-32 that feed the egress queue 55 or 56 coupled to it. Each enqueue policer 52 is configured to drop packets that would cause destination end-point capacity limits to be exceeded thereby preventing such packets from needlessly consuming network bandwidth beyond the intermediate node 33. In this regard, the enqueue policer 52 compares a flow parameter associated with the packets passing through the policer 52, such as the current average data rate or burst size measured for such packets at the input of the policer 52, and to then selectively drop data packets based on the comparison. By dropping such packets before the egress queues 55-56, the enqueue policers 52 also help to prevent congestion and data overflows in the egress queues 55-56.

In one exemplary embodiment, each enqueue policer 52 is respectively provisioned with an optimum profile ("$P_o$") based upon performance parameters of the egress nodes through which packets from the respective enqueue policer 52 pass. For example, an enqueue policer 52 may be provisioned based on an optimum enqueue policer rate ("$R_o$") and an optimum enqueue policer burst size ("$B_o$"). An exemplary algorithm for calculating $R_o$ and $B_o$ defines an ingress aggregate profile ("IAP") as (1) the sum of the ingress policer rates, R ("$IAP_R$"), and (2) the sum of the ingress policer burst sizes, B ("$IAP_B$"), for all of the ingress policers 38 that feed the enqueue policer 52. The egress aggregate profile ("EAP") is defined as (1) the sum of the egress shaper rate ("$EAP_R$") for all of the egress shapers 46 that receive packets flowing through the enqueue policer 52 and (2) the sum of the queue sizes ("$EAP_B$") for all of the queues 44 that receive packets flowing through the enqueue policer 52. $R_o$ is defined as the minimum of $IAP_R$ and $EAP_R$, and $B_o$ is defined as the minimum of $IAP_B$ and $EAP_B$. Thus, the enqueue policer 52 is provisioned with $R_o$ and $B_o$, where $R_o$ is the lesser of $IAP_R$ and $EAP_R$, and where $B_o$ is the lesser of $IAP_B$ and $EAP_B$. Notably, the ingress aggregate rate and burst size are included in the algorithm to conserve space within the policer's queue 55 or 56 since the intermediate node 33 may be used by multiple packet networks (not shown) having multiple ingress nodes (not shown).

As an example, referring to FIG. 2, assume that the ingress node 30 has policer parameters ("$P_{i1}$") defined such that $R_{i1}$ is equal to 5 megabits per second (Mb/s), and $B_{i1}$ is equal to 25 kilobytes (kB). The ingress node 31 has $P_{i2}$ defined such at $R_{i2}$ is equal to 8 Mb/s and $B_{i2}$ is equal to 8 kB. Furthermore, the ingress node 32 has $P_{i3}$ defined such at $R_{i3}$ is equal to 2 Mb/s and $B_{i3}$ is equal to 12 kB. Also assume that the shaper parameters of the egress node 34 are defined such that $R_{e1}$ is equal to 5 Mb/s and $Q_{e1}$ is equal to 25 kB. The egress node 35 has shaper parameters such that $R_{e2}$ is equal to 8 Mb/s and $Q_{e2}$ is equal to 8 kB, and the egress node 36 has shaper parameters such that $R_{e3}$ is equal to 2 Mb/s and $Q_{e3}$ is equal to 12 kB.

To determine the optimum enqueue policer profile, $P_{o1}$, for the enqueue policer 52 which polices the egress queue 55, the algorithm calculates $IAP_R$, $EAP_R$, $IAP_B$, and $EAP_B$ for all of the nodes 30-32, 34 coupled to the queue 55 to determine the optimum enqueue policer average rate, $R_{o1}$, and the optimum enqueue policer burst size, $B_{o1}$. The algorithm sums the rates ($R_{i1}$-$R_{i3}$) for all of the ingress nodes 30-32 to determine the $IAP_R$, and the algorithm sums the rate ($R_{e1}$) for the egress node 34 coupled to the queue 55 to determine the $EAP_R$. The $IAP_R$ is the sum of $R_{i1}$ (5 Mb/s), $R_{i2}$ (8 Mb/s), and $R_{i3}$ (2 Mb/s), which is 15 Mb/s. The $EAP_R$ is simply $R_{e1}$ (5 Mb/s) because the queue 55 only transmits data to the egress node 34. The algorithm then takes the minimum of the $IAP_R$ and the $EAP_R$ to determine $R_{o1}$ for the enqueue policer 52, which is 5 Mb/s.

The algorithm also sums the burst sizes ($B_{i1}$-$B_{i3}$) for all of the ingress nodes 30-32 to determine the $IAP_B$ for the policer 52 positioned before the queue 55, and the algorithm sums the burst size ($Q_{e1}$) for the egress node 34 to determine the $EAP_B$. The $IAP_B$ is the sum of $B_{i1}$ (25 kB), $B_{i2}$ (8 kB), and $B_{i3}$ (12 kB), which is 45 kB. The $EAP_B$ is simply $Q_{e1}$ (25 kB). Therefore, $B_{o1}$ as determined by the algorithm is the minimum of $IAP_B$ and $EAP_B$, which is 25 kB. Accordingly, the policer parameters for the enqueue policer 52 positioned before the queue 55 are 5 Mb/s and 25 kB. By limiting the egress queue 55 to a rate of 5 Mb/s and a burst size of 25 kB (instead of allowing a rate of 15 Mb/s and a burst size of 45 kB), space within the queue 55 is conserved for packets which will ultimately reach their destination end-points rather than wasting space within the queue 55 on packets which will likely be dropped at a later point in the network 25. In addition, by dropping packets at the intermediate node 33 rather than at points downstream of the intermediate node 33, other network resources (e.g., other intermediate nodes (not shown) and egress nodes 34) are not burdened with processing such packets. Accordingly, the overall efficiency of the network 25 is enhanced.

Similarly, the parameters for the enqueue policer 52 positioned before the egress queue 56 are calculated by determining the minimum of $IAP_R$ and $EAP_R$ and the minimum of $IAP_B$ and $EAP_B$ for all of the nodes 30-32, 35-36 coupled to the queue 56. $IAP_R$ (15 Mb/s) and $IAP_B$ (45 kB) are the same values that were used for the enqueue policer 52 policing the queue 55 since all of the ingress nodes 30-32 are coupled to both policers 52. $EAP_R$ is the sum of $R_{e2}$ (8 Mb/s) and $R_{e3}$ (2 Mb/s), the rates of all of the egress nodes 35-36 coupled to the queue 56, which is 10 Mb/s. The algorithm then takes the minimum of $IAP_R$ and $EAP_R$ to determine $R_{o2}$, which is 10 Mb/s. $EAP_B$ is the sum of $Q_{e2}$ (8 kB) and $Q_{e3}$ (12 kB), the burst sizes for all of the egress nodes 35-36 coupled to the queue 56, which is 20 kB. The algorithm then takes the minimum of $IAP_B$ and $EAP_B$ to determine $B_{o2}$, which is 20 kB. Accordingly, the policer parameters ($P_{o2}$) for the enqueue policer 52 positioned before the queue 56 are 10 Mb/s and 20 kB. As set forth above, such parameters for the policers 52 allow packets which would likely be dropped at the egress nodes 34-36 to be dropped at the intermediate node 33 thereby reducing congestion in the queues 55, 56 and conserving resources downstream in the packet network 25.

Figure 3:
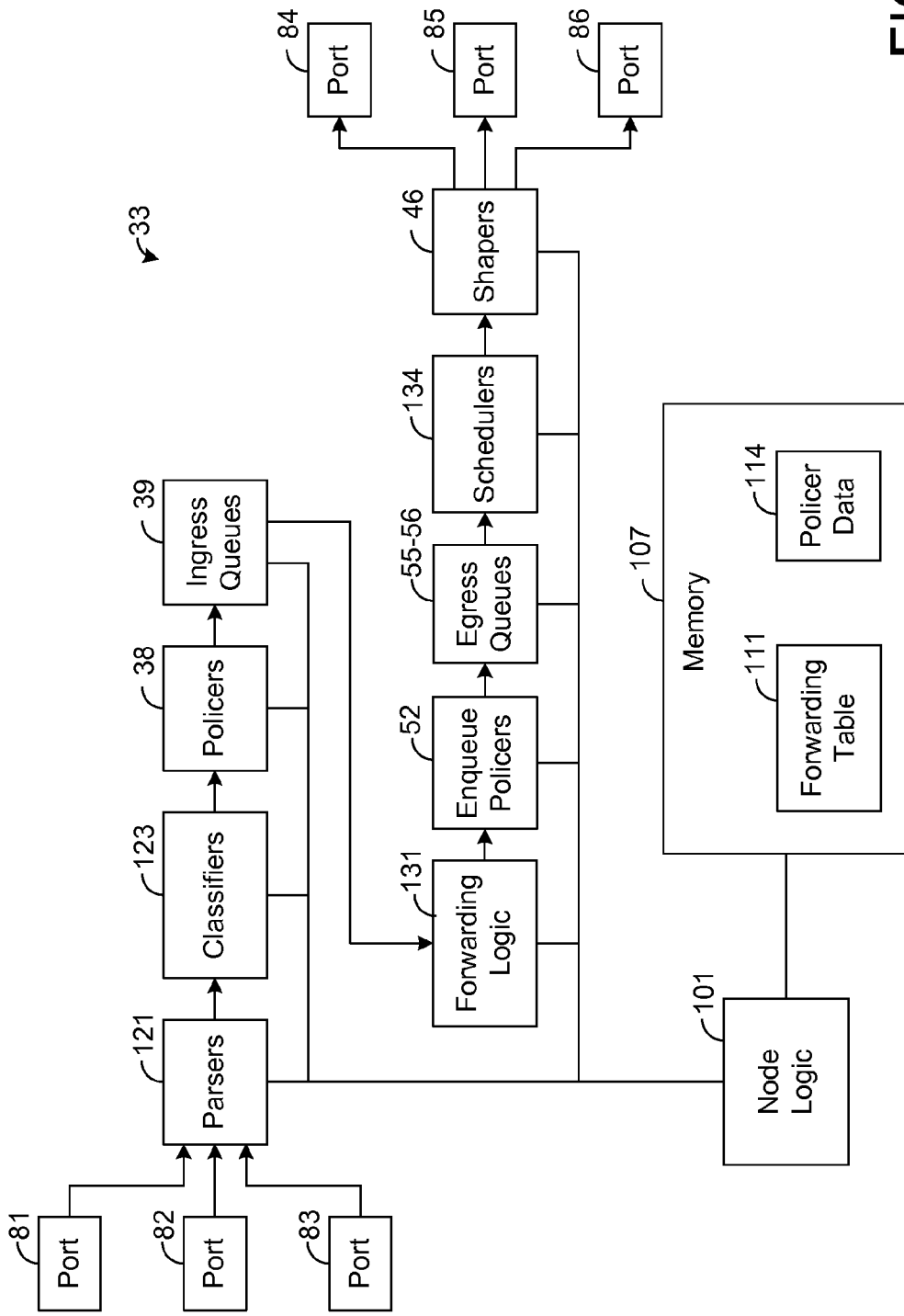
FIG. 3 is a block diagram illustrating an exemplary embodiment of an intermediate node, such as is depicted by FIG. 2.

FIG. 3 depicts an exemplary embodiment of an intermediate node 33. As shown by FIG. 3, the node 33 comprises a plurality of ports 81-83 and 84-86, respectively referred to as "ingress ports 81-83" and "egress ports 84-86." Data packets are received from other nodes via the ingress ports 81-83, and data packets are transmitted to other nodes via the egress ports 84-86. For illustrative purposes, FIG. 3 shows three ingress ports 81-83 and three egress ports 84-86, but any number of ingress ports and egress ports may be used in other embodiments.

As shown by FIG. 3, the exemplary node 33 comprises node logic 101 for generally controlling and managing the operation of the node 33. The node logic 101 can be implemented in software, hardware, firmware, or any combination thereof. In one exemplary embodiment, the node logic 101 is implemented in software and executed by a processing element (not specifically shown), such as a digital signal processor or central processing element, but other configurations the node logic 101 are possible in other embodiments.

A forwarding table 111 and policer data 114 are locally stored in memory 107, as shown by FIG. 3. The forwarding table 111 indicates how packets received by the node 33 are to be forwarded within the node 33. For example, the forwarding table 111 may indicate which egress queue is to receive data packets from a particular data flow thereby controlling which egress port 84-86 transmits such data packets. The policer data 114 is provisioned by a service provider and indicates the appropriate data for the algorithm utilized to determine the optimum data rate, $R_o$, and optimum burst size, $B_o$, for the enqueue policers 52. For example, in one exemplary embodiment, the data 114 indicates $IAP_R$ (the sum of the rates of all of the ingress nodes 30-32), $EAP_R$ (the sum of the rates of all of the egress nodes 34-36), $IAP_B$ (the sum of the burst sizes of all of the ingress nodes 30-32), and $EAP_B$ (the sum of the burst sizes of all of the egress nodes 34-36), and the node logic 101 is configured to determine $R_o$ by taking the minimum of $IAP_R$ and $EAP_R$ and to determine $B_o$ by taking the minimum of $IAP_B$ and $EAP_B$. After determining $R_o$ and $B_o$, the node logic 101 stores such values in memory 107 as part of the policer data 114 or otherwise. In another embodiment, $R_o$ and $B_o$ are manually calculated by a service provider and the values for $R_o$ and $B_o$ are provisioned into the policer data 114.

As shown by FIG. 3, data packets received by the ingress ports 81-83 generally flow through parsers 121, classifiers 123, policers 38, ingress queues 39, forwarding logic 131, enqueue policers 52, egress queues 55-56, schedulers 134, and shapers 46. For each received data packet, a parser 121 recovers from the packet or otherwise determines metadata that is indicative of various attributes associated with the packet. As an example, the metadata may include address identifiers within the packet, such as the packet's destination or source address, and the metadata may include parameters not contained with the packet, such as the identifier of the node's ingress port 81-83 that received the packet. Various other types of information may be indicated by the metadata as known in the art.

For each data packet, a classifier 123 classifies the packet. As an example, the classifier 123 may indicate the service type associated with the packet's flow, and prioritization within the node 33 may be based on such classification. For example, a policer 38 may be configured to drop data packets based on the prioritization levels assigned to the packets by the classifiers 123 in order to handle congestion and, in particular, prevent data overflow in the ingress queues 39. In addition, in one exemplary embodiment, each data flow serviced by the node 33 has an identifier, referred to as a "flow identifier." Such identifier may be used to process the packets from the data flow, as will be described in more detail hereafter. The flow identifier is assigned to and correlated with a packet by the classifier 123 based on the packet's metadata, such as an address with the packet and/or a port identifier identifying the ingress port 81-83 that received the packet.

The forwarding logic 131 pulls packets from the ingress queues 39 and forwards such packets to the egress queues 55-56 based on the forwarding table 111. In this regard, as described above, the forwarding table 111 maps packets to egress queues 55-56 so that the packets are forwarded to the appropriate egress queues 55-56. In one exemplary embodiment, the mappings are based on the flow identifiers. As an example, the forwarding table 111 may map a flow identifier to a particular egress queue 55-56 such that each packet correlated with such flow identifier is forwarded by the forwarding logic 131 to such egress queue 55-56 and, therefore, is transmitted across the same link to the same node of the network 25. In one exemplary embodiment, each egress queue 55-56 is coupled to a single egress port 84-86 such that each packet stored in the same egress queue 55-56 is transmitted via the same egress port 84-86, but other configurations of the node 33 are possible in other embodiments.

In one exemplary embodiment, the enqueue policers 52 are positioned before the egress queues 55-56 and are configured to allow packets into the queues 55-56 which do not exceed capacity limitations for $R_o$ and $B_o$ at the egress nodes 34-36 but reject packets which exceed the capacity limitations of the egress nodes 34-36, as described in detail above. The enqueue policers 52 are aware of $R_o$ and $B_o$ used in such policing by retrieving these parameters from memory 107. In this regard, each policer 52 determines the current average data rate (R) and the current burst size (B) for the flow of data packets at its input and compares R and B to its $R_o$ and $B_o$, respectively. Further, the policer 52 selectively drops packets so that the R and B at its output do not exceed $R_o$ and $B_o$, respectively. As an example, the policer 52 may use a leaky bucket algorithm to police the flow of packets at its input. In other embodiments, other types of parameters may be analyzed to determine when to drop data packets, and other types of algorithms may be used to police the packet flow. The policing performed by the enqueue policers 52 prevents congestion within the queues 55-56 thereby helping to prevent data overflows in the queues 55-56. In addition, network resources are conserved for packets which will ultimately reach their destination endpoints while packets which will not likely reach their destination end-points are dropped at a relatively early point in the network 25.

The schedulers 134 determine the order in which data is pulled from the egress queues 55-56, and the shapers 46 determine the timing of when data is pulled from the egress queues 55-56, as known in the art.

Figure 4:
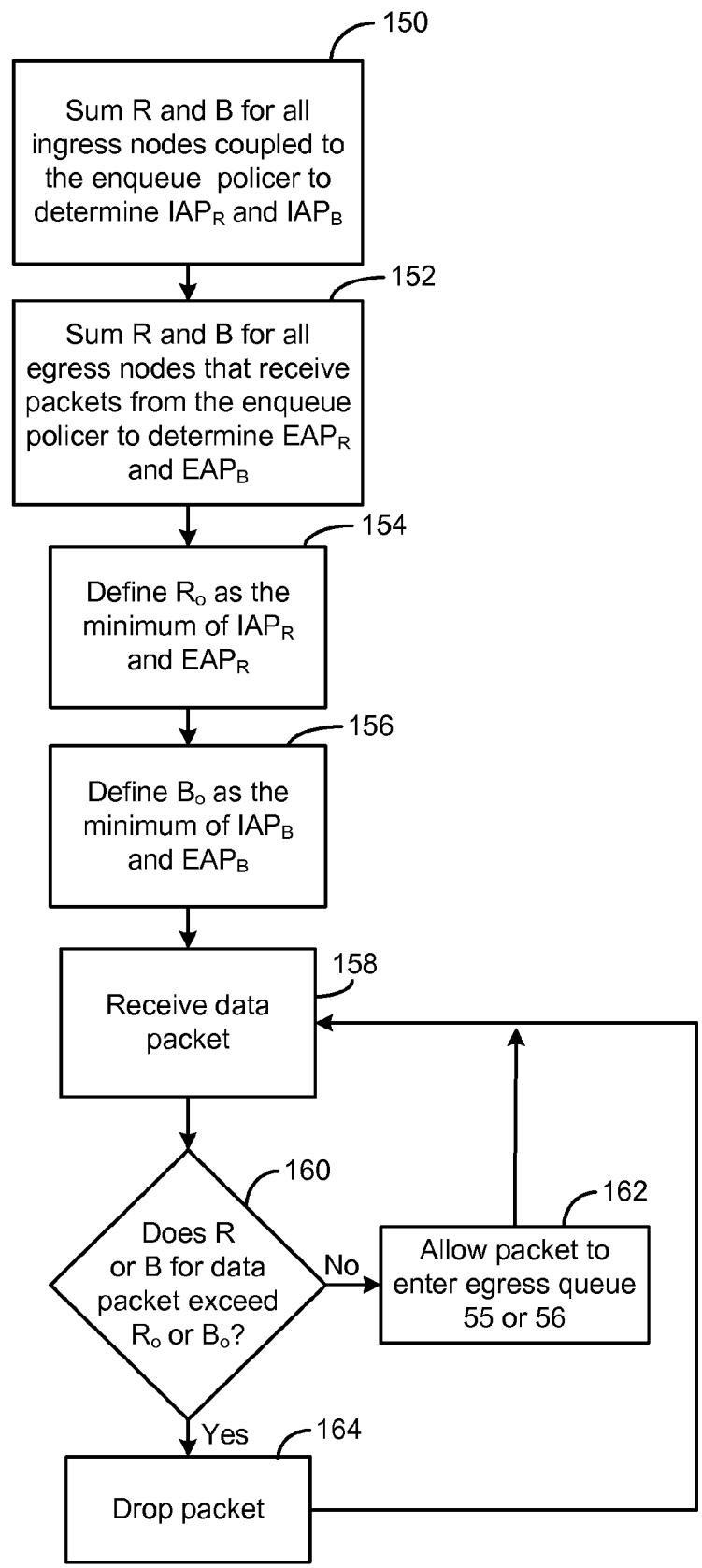
FIG. 4 is a flowchart illustrating an exemplary method for policing an egress queue in an intermediate node of a packet network, such as is depicted by FIG. 3.

In one exemplary embodiment, assume that the intermediate node 33 is coupled to three ingress nodes 30-32 and to three egress nodes 34-36. Also assume that the intermediate node 33 comprises enqueue policers 52 positioned before the egress queues 55-56. Each policer 52 accesses policer data 114 stored in memory 107 and determines its respective optimum policer rate, $R_o$, and the optimum policer burst size, $B_o$. FIG. 4 shows an exemplary flow chart for policing one of the egress queues 55 or 56 of the intermediate node 33. For illustrative purposes, the flow chart will be described hereafter for the policer 52 that polices the egress queue 55. Similar techniques may be used by the policer 52 that polices the egress queue 56. However, since such policer 52 feeds different egress nodes, the values of $R_o$ and $B_o$ may be different than the values of $R_o$ and $B_o$ for the policer 52 that services the egress queue 55.

As shown by block 150 of FIG. 4, $IAP_R$ and the $IAP_B$ are determined by summing R and B for each of the ingress nodes 30-32 that feed the policer 52, and the $EAP_R$ and the $EAP_B$ for the policer 52 are determined by summing R and B for each of the egress nodes 34-36 fed by the egress queue 55 that is serviced by the policer 52, as shown by block 152. $R_o$ is then defined as the minimum of the $IAP_R$ and the $EAP_R$, as shown by block 154, and $B_o$ is defined as the minimum of the $IAP_B$ and the $EAP_B$, as shown by block 156. Data packets are transmitted from each of the ingress nodes 30-32 to the enqueue policer 52, as shown by block 158, and R and B for the data packets are then respectively compared to $R_o$ and $B_o$, as shown by block 160. In this regard, the policer 52 determines the flow's current R and B at the input of the policer 52. If R exceeds $R_o$ or if B exceeds $B_o$, then the policer 52 drops the packet, as shown by block 164, so that the R and B at the output of the policer remain below $R_o$ and $B_o$, respectively. However, If R does not exceed $R_o$ and if B does not exceeds $B_o$ at the input of the policer 52, then the policer 52 does not drop the packet but rather allows the packet to pass to the egress queue 55 that is coupled to the policer 52, as shown by block 162.

Now, therefore, the following is claimed:

1. A packet network, comprising:
   an ingress node for a packet flow at a first edge of the packet network, wherein the packet flow enters the packet network through the ingress node;
   an egress node for the packet flow at a second edge of the packet network, wherein the packet flow exits the packet network through the egress node; and
   an intermediate node coupled between the ingress node and the egress node, the intermediate node having a first egress queue configured to store data packets of the packet flow, the intermediate node further having a policer coupled between the ingress node and the first egress queue, wherein the policer is configured to perform a comparison between a flow parameter for data packets of the packet flow passing through the policer and a threshold and to selectively drop data packets of the packet flow based on the comparison, and wherein the threshold is based on a performance parameter of the egress node and a performance parameter of the ingress node.

2. The packet network of claim 1, wherein the performance parameter of the egress node is an egress shaper rate of the egress node.

3. The packet network of claim 1, wherein the performance parameter of the egress node is a queue size for an egress queue of the egress node.

4. The packet network of claim 1, wherein the intermediate node comprises:
   a plurality of ports; and
   forwarding logic configured to forward data packets received by at least one of the ports to a plurality of egress queues of the intermediate node based on forwarding data, each of the plurality of egress queues coupled to a respective one of the ports in a manner such that data packets in the respective egress queue are received by the at least one port, the forwarding data mapping packet flow identifiers to port identifiers,
   wherein the policer is positioned between the forwarding logic and the first egress queue.

5. The packet network of claim 4, wherein the intermediate node further comprises a plurality of ingress queues coupled respectively to the plurality of ports, wherein the forwarding logic is configured to pull data packets from the ingress queues and forward the pulled data packets to the plurality of egress queues based on the forwarding data.

6. The packet network of claim 5, wherein the intermediate node comprises an ingress policer positioned between one of the ports and one of the ingress queues, and wherein the data packets of the packet flow stored by the first ingress node pass through the ingress policer.

7. The packet network of claim 1, wherein the ingress node has a policer configured to selectively drop data packets of the packet flow based on a performance parameter of the ingress node.

8. The packet network of claim 1, wherein the packet flow is transmitted from a customer premises transceiver, and wherein the egress node is coupled to and transmits the packet flow to a core network.

9. The packet network of claim 1, wherein packet network further comprises a second intermediate node coupled between the egress queue and the egress node, wherein the second intermediate node is configured to receive data packets of the packet flow from the egress queue and to transmit the received data packets of the packet flow to the egress node.

10. The packet network of claim 1, wherein the packet flow is communicated through the packet network between a core network of a communication system and at least one customer premises transceiver.

11. The packet network of claim 1, wherein the flow parameter is indicative of a data rate or a burst size for the packet flow.

12. A policing method, comprising:
    receiving data packets at an ingress node of a packet network, the ingress node located at a first edge of a packet network such that each of the data packets enters the packet network through the ingress node, wherein the data packets include at least a first data packet and a second data packet;
    transmitting each of the data packets from the ingress node to an intermediate node of the packet network;
    transmitting at least the second data packet from the intermediate node to an egress node of the packet network, the egress node located at a second edge of the packet network such that the second data packet exits the packet network through the egress node;
    comparing a flow parameter for the data packets to a threshold;
    determining the threshold based on a performance parameter of the egress node and a performance parameter of the ingress node; and
    selectively dropping at least the first data packet at the intermediate node based on the comparing.

13. The method of claim 12, wherein the flow parameter is a data rate of the received data packets.

14. The method of claim 12, wherein the flow parameter is a burst size of the received data packets.

15. The method of claim 12, wherein the performance parameter of the egress node is an egress shaper rate of the egress node.

16. The method of claim 12, wherein the performance parameter of the egress node is a queue size for an egress queue of the egress node.

17. The method of claim 12, further comprising:
    storing at least one of the data packets in an ingress queue of the intermediate node; and
    pulling the at least one data packet from the ingress queue and forwarding the at least one data packet from the ingress queue to the egress queue,
    wherein the dropping is performed by a policer positioned between the ingress queue and the egress queue.

18. The method of claim 12, further comprising:
    transmitting the data packets from a customer premises transceiver; and transmitting the second data packet from the egress node to a core network.

19. The method of claim 12, further comprising communicating the data packets through the packet network between a core network of a communication system and at least one customer premises transceiver.

20. The method of claim 12, wherein the flow parameter is indicative of a data rate or a burst size for the data packets.

21. A policing method, comprising:
    receiving a packet flow at an ingress node of a packet network, the ingress node located at a first edge of a packet network such that the packet flow enters the packet network through the ingress node;
    transmitting the packet flow from the ingress node through an egress queue of at least one intermediate node of the packet network to an egress node of the packet network, the egress node located at a second edge of the packet network such that the packet flow exits the packet network through the egress node;
    comparing a flow parameter for the packet flow to a threshold;
    determining the threshold based on a performance parameter of the egress node and a performance parameter of the ingress node; and
    selectively dropping at least one data packet of the packet flow based on the comparing prior to the one data packet reaching the egress queue of the intermediate node such that the one data packet does not exit the packet network.

22. The method of claim 21, further comprising:
    transmitting the packet flow from a customer premises transceiver; and
    transmitting the packet flow from the egress node to a core network.

23. The method of claim 21, further comprising transmitting the packet flow from the egress queue through at least one intermediate node of the packet network to the egress node.

24. The method of claim 21, further comprising communicating the packet flow through the packet network between a core network of a communication system and at least one customer premises transceiver.

25. The method of claim 21, wherein the flow parameter is indicative of a data rate or a burst size for the packet flow.

* * * * *